United States Patent
Khalil et al.

(10) Patent No.: US 10,447,693 B2
(45) Date of Patent: *Oct. 15, 2019

(54) SELECTIVELY PERMITTING A RECEIVER DEVICE TO ACCESS A MESSAGE BASED ON AUTHENTICATING THE RECEIVER DEVICE

(71) Applicant: Verizon Patent and Licensing Inc., Basking Ridge, NJ (US)

(72) Inventors: Manah M. Khalil, Coppell, TX (US); Zohar Fuchs, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,122

(22) Filed: Apr. 2, 2018

(65) Prior Publication Data
US 2018/0227298 A1 Aug. 9, 2018

Related U.S. Application Data

(63) Continuation-in-part of application No. 15/008,820, filed on Jan. 28, 2016, now Pat. No. 9,935,952.

(51) Int. Cl.
*H04L 29/06* (2006.01)
(52) U.S. Cl.
CPC ......... *H04L 63/0876* (2013.01); *H04L 63/20* (2013.01)

(58) Field of Classification Search
CPC .............. H04L 63/0876; H04L 63/20
USPC ............................................. 726/3
See application file for complete search history.

(56) References Cited

U.S. PATENT DOCUMENTS

| | | | | |
|---|---|---|---|---|
| 2010/0182970 | A1* | 7/2010 | Cherian ............... | H04W 8/18 370/329 |
| 2011/0219236 | A1* | 9/2011 | Wang .................. | G06F 21/10 713/176 |
| 2015/0040200 | A1* | 2/2015 | Gantman ............. | G06F 21/44 726/7 |
| 2015/0381716 | A1* | 12/2015 | Moon ................... | H04L 67/104 713/171 |
| 2017/0193448 | A1* | 7/2017 | Piyush ................ | G06Q 10/103 |

* cited by examiner

*Primary Examiner* — Anthony D Brown

(57) ABSTRACT

A device may receive an indication to generate a link associated with accessing a message. The message may be intended for a shared device identifier of a receiver device identified by a receiver device identifier, where the shared device identifier is shared by multiple receiver devices. The device may generate the link using information associated with the message. The device may provide the link to the receiver device after generating the link. The device may receive a request, from a requesting device, to access the message, the request including a device identifier associated with the requesting device. The device may selectively permit or prevent access to the message, by the requesting device, based on the receiver device identifier and the device identifier associated with the requesting device.

20 Claims, 5 Drawing Sheets

SELECTIVELY PERMITTING A RECEIVER DEVICE TO ACCESS A MESSAGE BASED ON AUTHENTICATING THE RECEIVER DEVICE

CROSS-REFERENCE TO RELATED APPLICATION

This application is a continuation-in-part of U.S. application Ser. No. 15/008,820, filed Jan. 28, 2016, the contents of which are incorporated by reference herein.

BACKGROUND

Devices may exchange digital and/or electronic messages. Transmitting the messages may include using a messaging service associated with a telephone, a network, and/or a mobile communication system. The devices may use communication protocols to enable the exchange of the messages between the devices. Transmitting the messages from a first device to a second device may include transmitting the messages via another device.

DETAILED DESCRIPTION OF PREFERRED EMBODIMENTS

The following detailed description of example implementations refers to the accompanying drawings. The same reference numbers in different drawings may identify the same or similar elements.

Devices (e.g., a sender device and a receiver device, such as a mobile phone, or a web server) may exchange messages, such as short message service (SMS) messages, multimedia messaging service (MMS) messages, email messages, or the like. In some cases, the exchange of messages may include an unsecure exchange and/or may include security vulnerabilities where, for example, users of devices other than an intended receiver device may access, view, and/or copy the messages.

For example, multiple receiver devices may share an identifier, such as an account identifier, a user identifier, or the like. When a sender device transmits a message to the shared identification number and/or account identifier, the message may be accessible on all receiver devices associated with the shared identification number, even if the message is intended for a particular receiver device, thereby decreasing security of the message contents. As another example, a receiver device may be associated with an application, such as an application installed on the device, an application executing on the device, an application executed remotely, or the like. In some cases, the application may be configured to capture a screenshot image, a screengrab image, or the like, of a message that the receiver device receives. This may enable an unintended third party to access the message, thereby decreasing security of the message contents.

Implementations described herein enable a message delivery device to selectively permit and/or prevent access to a message based on authenticating a receiver device requesting access to the message. In this way, the message delivery device may increase a security of the receiver device by permitting access to the message only when the message delivery device verifies that the receiver device requesting access to the message is the intended receiver device of the message. In addition, the message delivery device may conserve computing and/or processor resources by selectively generating the link for a subset of the messages received, rather than generating a link for all messages received, as described below.

Figure 1A:
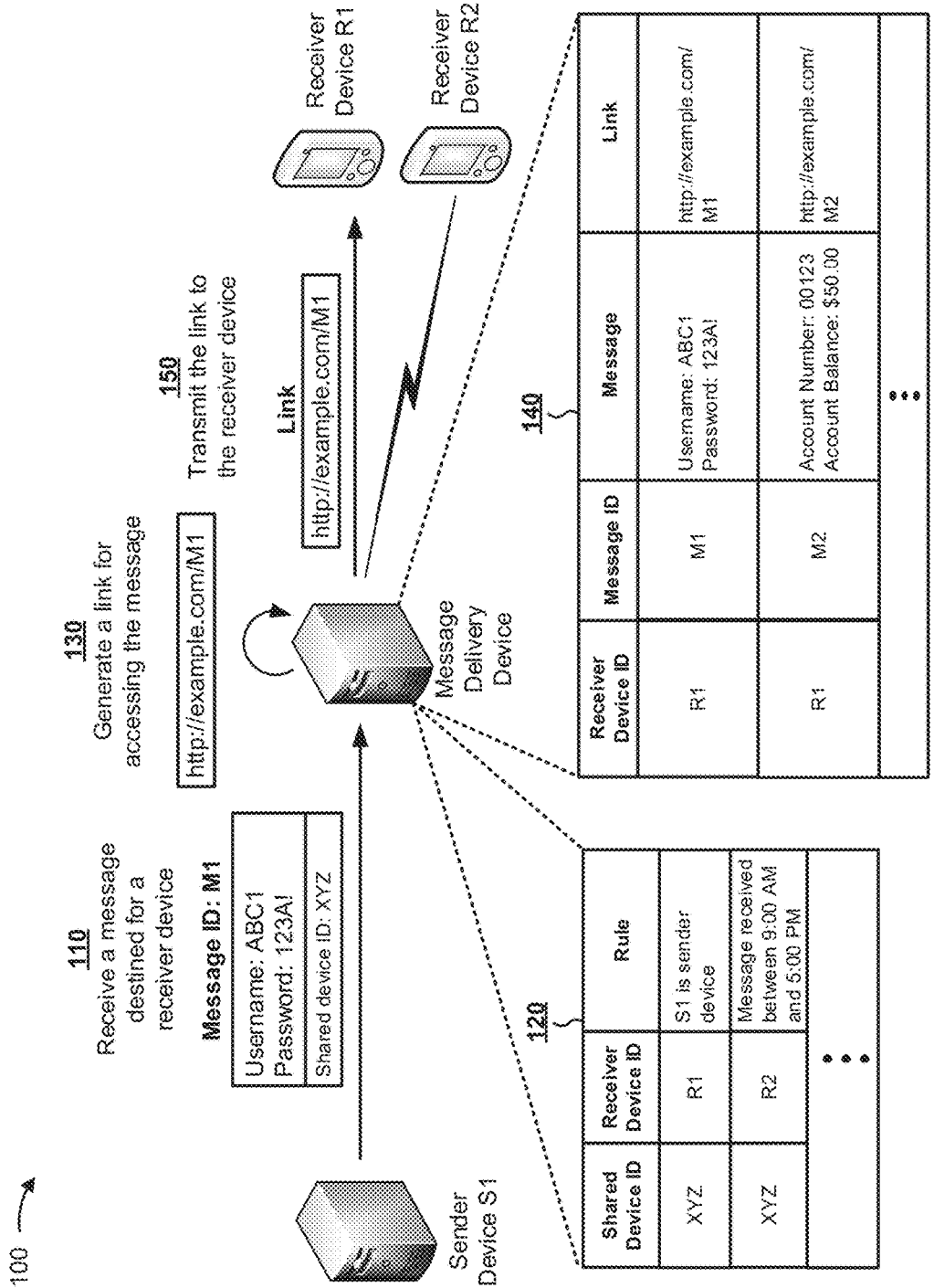
FIGS. 1A and 1B are diagrams of an overview of an example implementation described herein.
Figure 1B:
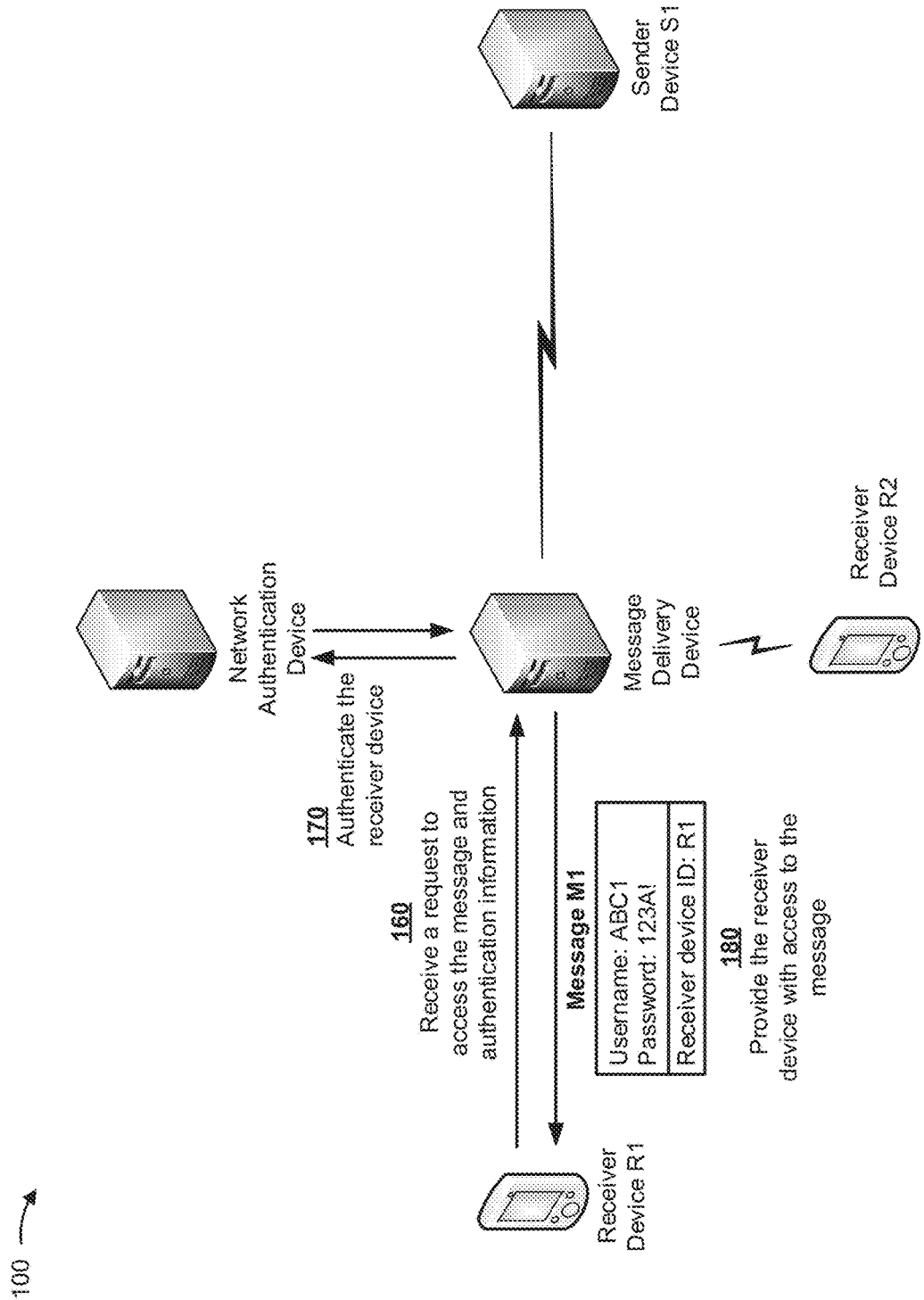

FIGS. 1A and 1B are diagrams of an overview of an example implementation 100 described herein. As shown by FIG. 1A, and by reference number 110, a message delivery device may receive a message from a sender device S1 destined for one or more receiver devices (e.g., an SMS message, an MMS message, or an email message). The message may be associated with a message identifier (ID) that identifies the message (e.g., shown as "M1"). As further shown by reference number 110, the message may include text strings (e.g., shown as "Username: ABC1" and "Password: 123A!"). The message may include information that indicates that the message is intended for shared device ID XYZ (e.g., an account identifier) of one or more receiver devices. Assume, for example, that receiver devices R1 and R2 are associated with shared device ID XYZ.

As shown by reference number 120, the message delivery device may use a stored association between the shared device ID, the receiver device ID, and a rule for transmitting the link, to determine whether to transmit the link to a particular receiver device ID. For example, the message delivery device may look up shared device ID XYZ and determine to transmit the link to receiver device R1, and not to receiver device R2, based on sender device S1 transmitting the message. The message delivery device may use similar stored associations for other messages (e.g., intended for the same shared device ID or a different shared device ID).

As shown by reference number 130, the message delivery device may generate a link for accessing the message (e.g., shown as "http://example.com/M1"). Assume, for example, that the message delivery device generates a Hypertext Transfer Protocol (HTTP) link and includes a uniform resource locator (URL) indicating a hostname of the URL (e.g., shown as "example.com") and a message identifier of the message, which in this example is the message ID M1.

As shown by reference number 140, the message delivery device may store the receiver device ID, the message ID, the message, the link for accessing the message, or the like. For example, the message delivery device may store message ID M1 in association with receiver device ID R1, the message (e.g., the contents of the message), and/or the link for accessing message M1. The message delivery device may store similar information for other messages (e.g., associated with the same receiver device or different receiver devices). As shown by reference number 150, the message delivery device may transmit the link to the receiver device (e.g., to an application operating on the receiver device) rather than transmitting the message, which may increase security of the message by requiring authentication of the receiver device prior to accessing the message, as described below.

As shown by FIG. 1B, and by reference number 160, the message delivery device may receive, from the receiver device, a request to access the message (e.g., message M1). For example, a user of the receiver device may click the link received from the message delivery device. As further shown, the message delivery device may receive, from the receiver device, authentication information, such as information indicating a digital certificate, information indicating a security token, the receiver device ID, subscriber information, or the like. Assume, for example, that the message delivery device receives a receiver device ID and a digital certificate, from the receiver device, as the authentication information. Additionally, or alternatively, the authentication information may include verification information designed to verify that the request to access the message was provided by a user, rather than a potentially malicious application. For example, the verification information may include biometric data (e.g., fingerprint data, voice authentication data, and/or the like), a password, a personal identification number (PIN), a Completely Automated Public Turing test to tell Computers and Humans Apart (CAPTCHA), and/or the like.

As shown by reference number 170, the message delivery device may authenticate and/or verify the receiver device using the authentication information and/or the verification information received from the receiver device when the receiver device requests to access the message. In some implementations, the message delivery device may transmit the authentication information and/or the verification information to a network authentication device for authentication. In example implementation 100, assume that the network authentication device authenticates the receiver device using the authentication information, and provides an indication, to the message delivery device, that the receiver device has been authenticated.

As shown by reference number 180, the message delivery device may provide the receiver device with access to the message, such as by transmitting the message to the receiver device, after authenticating the receiver device. In some implementations, the message delivery device may prevent the receiver device from accessing the message when authentication fails, thereby increasing security of the message contents. Additionally, or alternatively, security of the message contents may be improved, and computing resource conserved, by the message delivery service deleting message contents, links to message contents, and/or the like, based on certain criteria, such as the passage of a period of time, the message being viewed, and/or the like. Additional details regarding secure delivery of messages are described in more detail below.

In this way, a message delivery device may increase security of a message destined for a receiver device, by authenticating and/or verifying the receiver device requesting to access the message. In addition, the message delivery device may conserve processor and/or memory resources by transmitting messages to fewer than all of the receiver devices associated with a shared device identifier and by selectively deleting messages rather than storing messages indefinitely. Additionally, the message delivery device may conserve processor and/or memory resources of a receiver device, associated with a shared device identifier, by preventing the receiver device from receiving some messages that are intended for the shared device identifier. Further, the message delivery device may conserve network resources by selectively transmitting messages rather than transmitting the messages to all of the receiver devices associated with a shared device identifier.

As indicated above, FIGS. 1A and 1B are provided merely as an example. Other examples are possible and may differ from what was described with regard to FIGS. 1A and 1B. For example, in some implementations (e.g., where the message delivery device is part of a different telecommunications network than the sender device), the sender device may generate the link for accessing the message, and may store the link using a message storage device that requires network authentication to access the link. In this case, the message delivery device may deliver the link to the receiver device, and the receiver device may access the message from the message storage device. The message storage device may authenticate the receiver device before providing access to the message (e.g., by communicating with the network authentication device, in a similar manner as described regarding communications between the message delivery device and the network authentication device).

Figure 2:
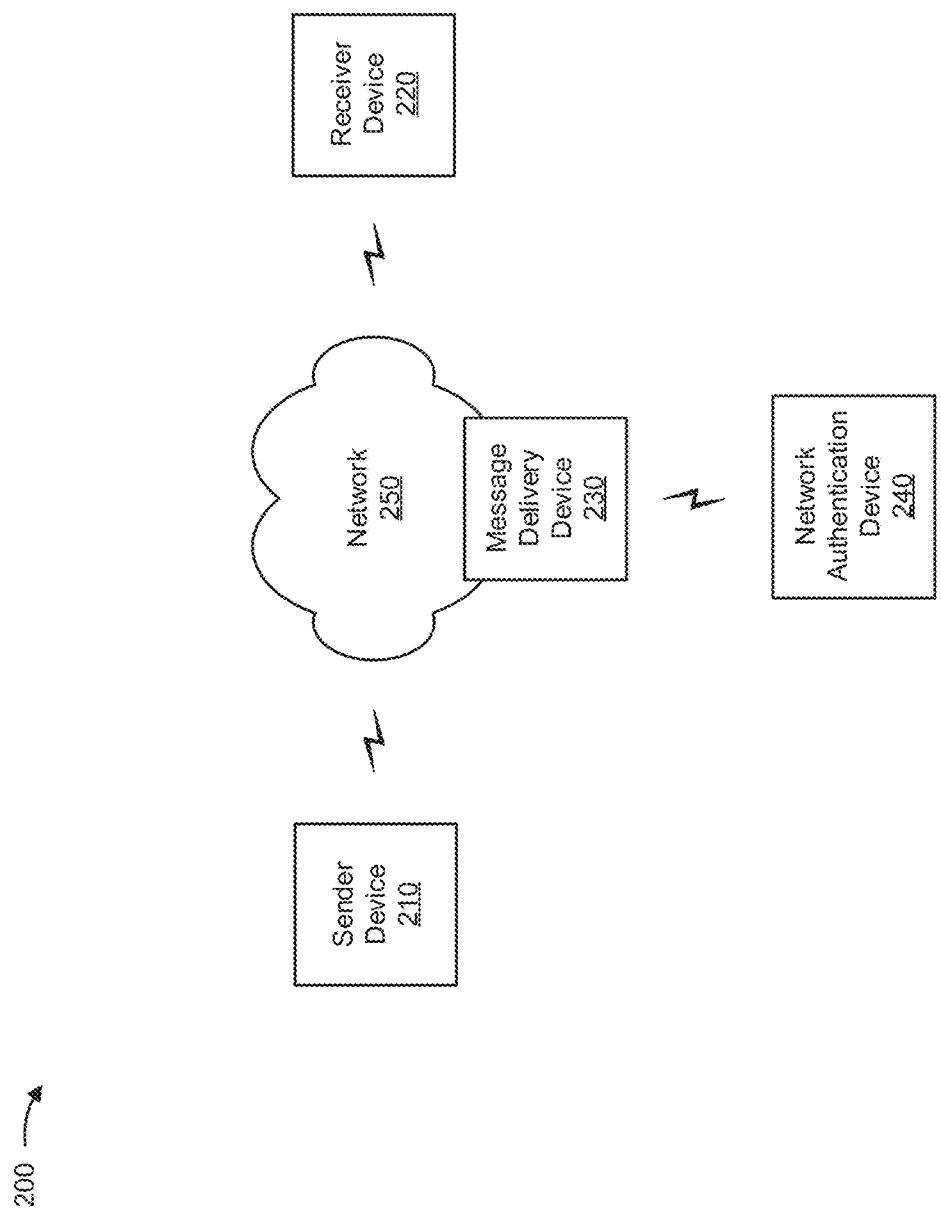
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a sender device 210, a receiver device 220, a message delivery device 230, a network authentication device 240, and a network 250. Devices of environment 200 may interconnect via wired connections, wireless connections, or a combination of wired and wireless connections.

Sender device 210 may include one or more devices capable of sending a message via network 250. For example, sender device 210 may include a mobile phone (e.g., a smart phone or a radiotelephone), a server (e.g., a web server or a host server), a laptop computer, a tablet computer, a handheld computer, a gaming device, a wearable communication device a smart wristwatch or a pair of smart eyeglasses), a set top box, a desktop computer, or a similar type of device. In some implementations, sender device 210 may send a message intended for receiver device 220. Message delivery device 230 may receive the message, and may deliver the message to receiver device 220 after receiver device 220 has been authenticated.

Receiver device 220 may include one or more devices capable of receiving a message via network 250. For example, receiver device 220 may include a mobile phone (e.g., a smart phone or a radiotelephone), a server (e.g., a web server or a host server), a laptop computer, a tablet computer, a handheld computer, a gaming device, a wearable communication device a smart wristwatch or a pair of smart eyeglasses), a set top box, a desktop computer, or a similar type of device. In some implementations, receiver device 220 may share a receiver device identifier with one or more other receiver devices 220. In some implementations, receiver device 220 may receive a message from sender device 210. Message delivery device 230 may receive the message, and may deliver the message to receiver device 220 after receiver device 220 has been authenticated.

Message delivery device 230 may include one or more devices capable of receiving, storing, processing, and/or providing a message. For example, message delivery device 230 may include a short message service center (SMSC) delivery server, a multimedia message service center (MSMC) delivery server, an email server, an instant message server, a voicemail server, or a similar type of device. In some implementations, message delivery device 230 may receive a message from sender device 210 and may store the message for later delivery to receiver device 220. In some implementations, message delivery device 230 may communicate with network authentication device 240 to authenticate receiver device 220 prior to delivering a message to receiver device 220. In some implementations, sender device 210 and message delivery device 230 may be implemented in a single device. In some implementations, the message may be stored by a message storage device that is different from message delivery device 230 (e.g., owned by a different entity). In this case, the message storage device may authenticate receiver device 220 prior to delivering the message to receiver device 220.

Network authentication device 240 may include one or more devices capable of authenticating and/or verifying another device (e.g., receiver device 220). For example, network authentication device 240 may include a server device, such as an authentication, authorization, and accounting server (AAA), a home subscriber server (HSS), or a similar type of device. Network authentication device 240 may receive authentication information, and/or verification information, relating to receiver device 220, from message delivery device 230, and may authenticate receiver device 220 based on the authentication information and/or verification information.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
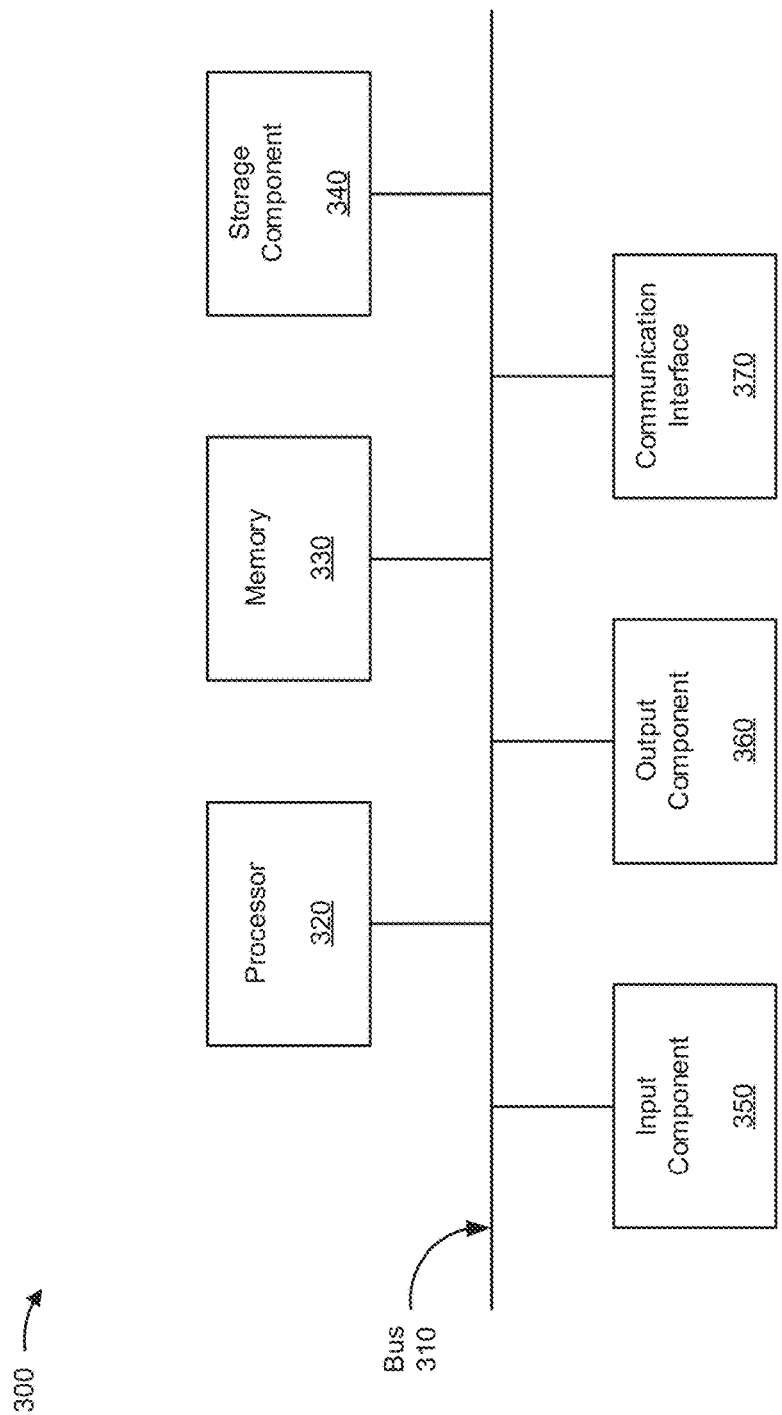
FIG. 3 is a diagram of example components of one or more devices of FIG. 2.

FIG. 3 is a diagram of example components of a device 300. Device 300 may correspond to sender device 210, receiver device 220, message delivery device 230, and/or network authentication device 240. In some implementations, sender device 210, receiver device 220, message delivery device 230, and/or network authentication device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor a central processing unit (CPU), a graphics processing unit (GPU), an accelerated processing unit (APU) etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, or an optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, or a solid state disk), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 may include a component that provides output information from device 300 (e.g., a display, a speaker, or one or more light-emitting diodes (LEDs)).

Communication interface 370 may include a transceiver-like component (e.g., a transceiver or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
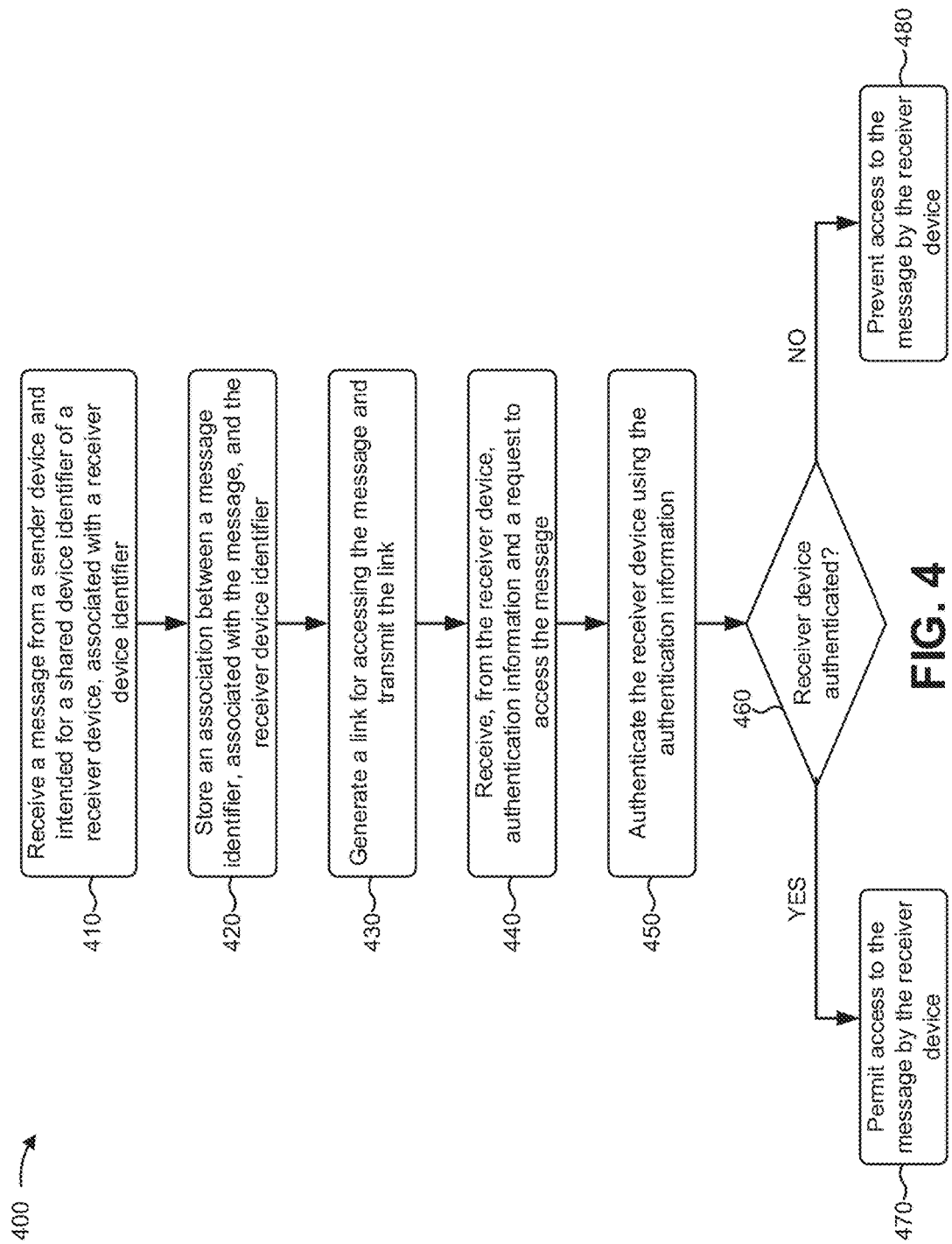
FIG. 4 is a flow chart of an example process for selectively permitting a receiver device to access a message based on authenticating the receiver device.

FIG. 4 is a flow chart of an example process 400 for selectively permitting a receiver device to access a message based on authenticating the receiver device. In some implementations, one or more process blocks of FIG. 4 may be performed by message delivery device 230. In some implementations, one or more process blocks of FIG. 4 may be performed by another device or a group of devices separate from or including message delivery device 230, such as sender device 210, network authentication device 240, and/or receiver device 220.

As shown in FIG. 4, process 400 may include receiving a message from a sender device and intended for a shared device identifier of a receiver device, associated with a receiver device identifier (block 410) and storing an association between a message identifier, associated with the message, and the receiver device identifier (block 420). For example, message delivery device 230 may receive a message (e.g., an SMS message or an MMS message) transmitted from sender device 210 (e.g., a first mobile phone) to receiver device 220 (e.g., a second mobile phone).

As another example, message delivery device 230 may receive a message (e.g., an SMS message or an email message) transmitted from sender device 210 (e.g., a web server) to receiver device 220 (e.g., a mobile phone). Additionally, or alternatively, message delivery device 230 may receive an indication, from sender device 210, that sender device 210 has a message to transmit (e.g., rather than receiving the message from sender device 210).

In some implementations, the message may indicate an intended shared device identifier that is shared by multiple receiver devices 220, such as an account identifier, a user identifier, or the like. In some implementations, the shared device identifier may indicate an intended destination of the message. In some implementations, the shared device identifier may be associated with one or more rules that indicate permitting a particular receiver device associated with the shared device identifier, to access the message, while restricting one or more other receiver devices 220, also associated with the shared device identifier, from accessing the message.

For example, a user of multiple receiver devices 220, associated with a shared device identifier, may define a rule that indicates that a particular receiver device 220 is to receive a message when the message is received at a particular time of the day (e.g., between the hours of 9:00 am and 5:00 pm) and/or a particular day of the week (e.g., Saturday or Sunday), when a particular sender (e.g., a financial institution or a healthcare provider) transmits the message, or the like. In some implementations, message delivery device 230 may compare the shared device identifier to a set of shared device identifiers to determine whether a rule applies to the shared device identifier. Where the comparison indicates a match, message delivery device 230 may identify a particular receiver device 220, of multiple receiver devices 220 associated with the shared device identifier, to permit to access the message. Additionally, or alternatively, a rule may indicate whether message delivery device 230 is to provide the message to receiver device 220 without generating a link and requiring authentication of receiver device 220 prior to accessing the message via the link, as described in more detail below.

This may increase security of the message by permitting a particular receiver device 220, associated with a shared device identifier, to access a message, while preventing other receiver devices 220 from accessing the message, when the other receiver devices 220 would otherwise have access to the message.

In some implementations, receiver device 220 may be associated with a receiver device identifier, such as a mobile directory number (MDN), a mobile telephone number (MTN), an internet protocol (IP) address, an international mobile station equipment identity (IMEI), an international mobile subscriber identity (IMSI), a globally unique temporary ID (GUTI), or the like. In some implementations, the receiver device identifier may include an identifier different from an email address. Message delivery device 230 may use the receiver device identifier to determine which receiver device 220 is the intended destination of the message. For example, the message received from sender device 210 may include the receiver device identifier. In some implementations, multiple receiver devices 220 may be associated with a single receiver device identifier.

In some implementations, a message may be associated with a message identifier (e.g., a value, such as a number or a string). Message delivery device 230 may use the message identifier to identify the message and to associate the message with a particular receiver device 220. In some implementations, the message received from sender device 210 may include the message identifier. Additionally, or alternatively, message delivery device 230 may assign the message identifier to the message.

In some implementations, message delivery device 230 may store the message, the message identifier, and/or the receiver device identifier (e.g., locally or on another device) in a manner that indicates an association between the message, the message identifier, and/or the receiver device identifier. For example, message delivery device 230 may store the message identifier and the receiver device identifier in a data structure that enables message delivery device 230 to determine that a particular message is destined for a particular receiver device 220.

As further shown in FIG. 4, process 400 may include generating a link for accessing the message and transmitting the link (block 430). For example, message delivery device 230 may generate a link (e.g., a resource identifier, such as a hyperlink, hypertext, or a uniform resource identifier) that permits access to the message. In some implementations, message delivery device 230 may generate the link using the message identifier. For example, message delivery device 230 may generate a URL that includes the message identifier as a character string included in the link (e.g., http://example.com/M1, where M1 is the character string).

In some implementations, message delivery device 230 may generate the link upon receipt of the message. Additionally, or alternatively, message delivery device 230 may generate the link based on a request, from sender device 210 and/or receiver device 220, to generate the link. In some implementations, sender device 210 may request to generate the link for all messages sent by sender device 210, for a particular message, for messages that satisfy a rule, or the like. Similarly, receiver device 220 may request to generate the link for all messages sent to receiver device 220, for a particular message, for messages that satisfy a rule, or the like.

For example, message delivery device 230 may receive a request from sender device 210 to generate the link for a particular message destined for receiver device 220 (e.g., rather than for all messages received from sender device 210 and/or destined for receiver device 220). As another example, message delivery device 230 may receive a request from receiver device 220 that indicates that message delivery device 230 is to generate a link for all inbound messages destined for receiver device 220, rather than generating the link for a particular message. In this way, message delivery device 230 may conserve computing resources, by generating a link for a subset of messages received.

In some implementations, message delivery device 230 may generate the link based on a rule. For example, message delivery device 230 may generate the link for a message based on identifying a particular text string included in the message (e.g., generate the link when the message includes any of the following text strings: "code," "username," "password," or "account"), which may enable message delivery device 230 to increase a security of message contents by identifying messages that may contain text indicative of, for example, sensitive information.

Additionally, or alternatively, message delivery device 230 may generate the link based on an identifier associated with sender device 210 and/or receiver device 220, which may be included with the message. For example, the message may include a security identifier indicating that sender device 210 and/or receiver device 220 are associated with increased security, such as when the security identifier indicates that sender device 210 and/or receiver device 220 is/are associated with a financial institution, a healthcare provider, a particular person, or the like, which may enable message delivery device 230 to increase security of message contents by identifying messages that may contain particularly sensitive information.

Additionally, or alternatively, message delivery device 230 may generate the link based on determining a location of receiver device 220 using location information associated with receiver device 220 (e.g., GPS information or radio signal information). For example, message delivery device 230 may generate the link when receiver device 220 is located in a particular country, outside of a particular country, in a particular geographic region, or the like, which may enable message delivery device 230 to increase security of message contents based on receiver device 220 being in an unexpected location, such as when a user of receiver device 220 has lost receiver device 220, when a third party has stolen receiver device 220, or the like.

Additionally, or alternatively, message delivery device 230 may generate the link based on a type of network connection of receiver device 220. For example, message delivery device 230 may generate the link when receiver device 220 is roaming (e.g., emitting a roaming signal), when receiver device 220 is connected to an LTE network via a wireless local area network (WLAN) (e.g., connected to the LTE network via an evolved packet data gateway (ePDG)), or the like, which may enable message delivery device 230 to increase security of message contents when receiver device 220 is connected to an unfamiliar, untrusted, and/or potentially unsecure WLAN. Additionally, or alternatively, message delivery device 230 may generate the link based on a subscription of sender device 210 and/or receiver device 220, such as when a user of sender device 210 and/or receiver device 220 pays to have message delivery device 230 generate the link to provide increased security.

In some implementations, message delivery device 230 may receive a link that another device has generated. For example, message delivery device 230 may receive a link that sender device 210 has generated and transmitted to message delivery device 230 for message delivery device 230 to transmit to receiver device 220.

In some implementations, message delivery device 230 may transmit the link to receiver device 220, such as via network 250. For example, message delivery device 230 may transmit the link to receiver device 220 associated with the receiver device identifier. In some implementations, message delivery device 230 may transmit the link to receiver device 220 in a manner designed to enable receiver device 220 to display the link an in application operating on receiver device 220 (e.g., a messaging application, a web browsing application, an application associated with message delivery device 230, and/or the like). Additionally, or alternatively, message delivery device 230 may transmit the link to sender device 210 for sender device 210 to transmit to receiver device 220.

In this way, a message delivery device may conserve computing and/or processor resources by generating a link for a subset messages received, rather than generating a link for all messages received. Additionally, the message delivery device may increase security by identifying sensitive messages, such as messages relating to account information, messages from a particular sender device, messages containing personal information, or the like.

As further shown in FIG. 4, process 400 may include receiving, from the receiver device, authentication information and a request to access the message (block 440). For example, message delivery device 230 may receive a request to access the message from a receiver device 220 (e.g., a receiver device 220 that is in the intended recipient of the message or a receiver device 220 that is not the intended recipient of the message) when a user of receiver device 220 clicks and/or selects the link.

In some implementations, message delivery device 230 may receive authentication information associated with receiver device 220, such as information indicating a digital certificate, information indicating a security token, a receiver device identifier, subscriber information (e.g., personal information, account information, username and/or password information, or biometric authentication information, or the like, in association with receiving the request to access the message. The authentication information may, in some implementations, include verification information designed to provide verification that receiver device 220 is operated by a user, rather than operated by a potentially malicious application. For example, personal information, username and/or password information, biometric authentication information, CAPTCHA information, and/or the like, may be used to verify the user of receiver device 220 (e.g., during authentication or separately from authentication). In some implementations, message delivery device 230 may use the authentication information to authenticate receiver device 220, as described below.

As further shown in FIG. 4, process 400 may include authenticating the receiver device using the authentication information (block 450). For example, message delivery device 230 may determine whether the authentication information received from receiver device 220 in association with the request to access the message correctly identifies receiver device 220, indicates that receiver device 220 has permission to access the message, matches authentication information stored by message delivery device 230 and/or network authentication device 240, or the like. In some implementations, message delivery device 230 may transmit the authentication information to network authentication device 240 and/or another device for authentication.

In some implementations, message delivery device 230 and/or a different device may determine whether receiver device 220 is the particular receiver device 220 associated with the message. For example, message delivery device 230 may transmit a digital certificate, which message delivery device 230 may receive from receiver device 220 as authentication information, to network authentication device 240 for authentication while message delivery device 230 compares the receiver device identifier associated with the request to the receiver device identifier associated with the message.

In some implementations, message delivery device 230 may verify that receiver device 220 is operated by a user (e.g., rather than operated by a malicious application). Message delivery device 230 may perform verification using verification information included in the authentication information (e.g., personal information, username and/or password information, biometric authentication information, CAPTCHA information, and/or the like). Verification may be performed by message delivery device 230 and/or a different device, such as network authentication device 240. As noted above, verification may be included in the authentication process or, in some implementations, verification may be a separate determination.

In this way, message delivery device 230 may increase security of message contents by authenticating that the receiver device requesting access to the message is the intended receiver device of the message and/or verifying that a user, of the intended receiver device, has requested access to the message.

As further shown in FIG. 4, process 400 may include determining whether the receiver device is authenticated (block 460). For example, message delivery device 230 may determine whether a particular receiver device 220 requesting access to the message is associated with the message, such as to prevent an unintended receiver device 220 from accessing the message. In some implementations, determining whether receiver device 220 is authenticated may include determining whether the receiver device 220 is verified (e.g., verified as being operated by a user based on verification information).

In some implementations, message delivery device 230 may use stored information associated with the message (e.g., a receiver device identifier) to determine whether the particular receiver device 220 is associated with the message, such as by determining whether a comparison of the stored information and the authentication information received from the particular receiver device 220 indicates a match. Additionally, or alternatively, message delivery device 230 may receive information and/or an indication from network authentication device 240 indicating whether receiver device 220 is authenticated and/or verified.

As further shown in FIG. 4, if the receiver device is authenticated (block 460 YES), then process 400 may include permitting access to the message by the receiver device (block 470). For example, message delivery device 230 may provide the message to receiver device 220, and receiver device 220 may provide the message for display, such as via a user interface of receiver device 220. In some implementations, receiver device 220 may provide the message for display via an application associated with receiver device 220, such as a messaging application, a web browsing application, an application associated with message delivery device 230, and/or the like.

In some implementations, when permitting receiver device 220 to access the message, message delivery device 230 may restrict receiver device 220 to accessing the message in a particular manner. For example, message delivery device 230 may restrict receiver device 220 to accessing the message via a particular application associated with receiver device 220 (e.g., an application configured to prevent screenshots and/or screen captures of the message), such as by providing the message in a format readable by the particular application, which may increase security of the message by preventing capture of the message by an unintended third party. As another example, message delivery device 230 may restrict receiver device 220 to accessing the message while connected to a particular network (e.g., an LTE network, Wi-Fi network, and/or the like), in a manner designed to decrease the likelihood that the message might be intercepted by an unintended third party.

Additionally, or alternatively, the particular application may be associated with a particular receiver device identifier, which may enable access to the message without login credentials, such as a username, password, or the like, thereby increasing security of the message by permitting access to the message by an application associated with the receiver device identifier, such as an application associated with message delivery device 230.

As another example, when permitting receiver device 220 to access the message, message delivery device 230 may restrict receiver device 220 from accessing the message via a web browser, such as by receiving an indication that receiver device 220 is attempting to access the message via a particular application or a web browser, which may increase security of the message contents by preventing access to the message via a potentially unsecure application.

As another example, message delivery device 230 may limit a time period for accessing the message, such as by permitting receiver device 220 to access the message within a particular amount of time after authenticating receiver device 220, after which message delivery device 230 may prevent receiver device 220 from accessing the message. As yet another example, message delivery device 230 may restrict receiver device 220 to a quantity of accesses, after which message delivery device 230 may prevent receiver device 220 from accessing the message. Limiting the time period for accessing the message and/or the quantity of accesses may increase security of the message by preventing receiver device 220 from having continuing access to the message.

In some implementations, message delivery device 230 may provide receiver device 220 with data that causes message delivery device 230 to bypass at least a portion of an authentication process for future message access by receiver device 220. For example, message delivery device 230 may provide receiver device 220 with data (e.g., cookie data) that receiver device 220 stores in a web browser application, enabling access to a message (or other messages) without re-entering login credentials, such as a username, password, or the like. Using data facilitates the conservation of computing resources, including processing and network resources, which would otherwise be used to repeatedly authenticate and/or verify receiver device 220. In some implementations data, (e.g., cookie data) may include an expiration date and time, or expiration based on other criteria (e.g., number of times a message is accessed, or multiple messages are accessed), enabling message delivery device 230 to restrict the manner in which receiver device 220 is capable of accessing messages without providing login credentials. In a situation where data (e.g., cookie data) is provided for storage by a web browsing application operating on receiver device 220, message delivery device 230 may restrict the type of network used to deliver data to receiver device 220. For example, to obviate potential unauthorized access by a third party device that might have breached Wi-Fi or local network security, message delivery device 230 may require receiver device 220 to switch to an LTE network to receive cookie data.

In some implementations, message delivery device 230 may receive an indication from receiver device 220 that receiver device 220 is not capable of accessing the message in the particular manner (e.g., because of a lack of network connectivity). In some implementations, when message delivery device 230 has received an indication that receiver device 220 is not capable of accessing the message in the particular manner, message delivery device 230 may permit receiver device 220 to access the message in a different manner. As an example, when receiver device 220 replies to a message that contains a link, message delivery device 230 may deliver the message to receiver device 220 (e.g., rather than the link).

As further shown in FIG. 4, if the receiver device is not authenticated (block 460 NO), then process 400 may include preventing access to the message by the receiver device (block 480). For example, message delivery device 230 may prevent transmission of the message to receiver device 220 and/or may not provide the message to receiver device 220 when message delivery device 230 and/or network authentication device 240 fail to authenticate receiver device 220. In some implementations, message delivery device 230 may provide an error message to receiver device 220 indicating that receiver device 220 may not access the message, and receiver device 220 may provide the error message for display.

In this way, message delivery device 230 may increase security of message contents by holding a message pending authentication of a receiver device requesting access to the message (e.g., rather than providing the receiver device with access to the message without authentication). Additional by holding the message pending authentication may conserve network resources and/or reduce network congestion by preventing the transmission of a message that the message delivery device would have otherwise transmitted.

In some implementations, message delivery device 230 may delete messages (and/or links to the messages) that are stored by or otherwise accessible to message delivery device 230. Messages and/or links may be deleted in a manner designed to provide additional security (e.g., by obviating potential risks of access by an unintended third party) and/or conserve computing resources (e.g., memory resources, storage resources, and/or the like). In some implementations, message delivery device 230 may store messages until the occurrence of an expiration event, such as a period of time passing, the message being accessed, and/or the like. For example, message delivery device 230 may store the message for a predetermined time before deleting the message, or store the message for a predetermined period of time after first being accessed. As another example expiration event, message delivery device 230 may delete a message after a particular number of times the message has been accessed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a message delivery device to authenticate a receiver device requesting access to a message and to selectively permit and/or prevent access to the message based on determining whether the receiver device is the intended recipient of the message. This may increase security of the message contents by permitting access to the message when the message delivery device authenticates the receiver device as the intended receiver device of the message and preventing access to the message when the message delivery device fails to authenticate the receiver device. Additionally, this may conserve processor resources of the message delivery device, conserve network resources, and/or reduce network congestion, by preventing the transmission of the message to the receiver device when the message delivery device would have otherwise transmitted the message.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive an indication to generate a link associated with accessing a message, the message being intended for a shared device identifier of a receiver device identified by a receiver device identifier,
the shared device identifier being shared by a plurality of receiver devices;
compare the shared device identifier and a set of shared device identifiers;
determine, based on comparing the shared device identifier and the set of shared device identifiers, whether a rule associated with generating the link is satisfied;
determine that the device is to generate the link, associated with accessing the message, based on determining that the rule is satisfied;
generate the link using information associated with the message;
provide the link to the receiver device after generating the link;
receive a request, from a requesting device, to access the message,
the request including a device identifier associated with the requesting device; and
selectively permit or prevent access to the message, by the requesting device, based on the receiver device identifier and the device identifier associated with the requesting device.

2. The device of claim 1, where the one or more processors, when selectively permitting or preventing access to the message, are to:
authenticate the requesting device, using the device identifier associated with the requesting device, included with the request, and the receiver device identifier; and
selectively permit or prevent access to the message based on a result of authenticating the requesting device.

3. The device of claim 1, where the one or more processors, when selectively permitting or preventing access to the message, are to:
permit access to the message, by the requesting device, when the device identifier associated with the requesting device, included with the request, matches the receiver device identifier.

4. The device of claim 1, where the one or more processors, when selectively permitting or preventing access to the message, are to:
prevent access to the message, by the requesting device, when the device identifier associated with the requesting device, included with the request, does not match the receiver device identifier.

5. The device of claim 1, where the one or more processors, when providing the link to the receiver device, are to:
set an expiration event associated with the link; and
delete the link and the message based on the expiration event occurring.

6. The device of claim 1, where the one or more processors, when receiving the indication to generate the link, are to:
receive the message;
identify the receiver device, associated with the shared device identifier, when comparing the shared device identifier and the set of shared device identifiers indicates a match between the shared device identifier and the set of shared device identifiers; and
determine that the device is to generate the link associated with accessing the message based on identifying the receiver device.

7. The device of claim 1, where the one or more processors, when selectively permitting or preventing access to the message, are to:
authenticate the requesting device using verification information provided by the requesting device,
the verification information including at least one of:
a CAPTCHA,
a password,
a personal identification number, or
biometric data; and
selectively permit or prevent access to the message based on a result of authenticating the requesting device.

8. A non-transitory computer-readable medium storing instructions, the instructions comprising:
one or more instructions that, when executed by one or more processors, cause the one or more processors to:
receive an indication to generate a resource identifier associated with accessing a message,
the message being transmitted from a first device and intended for a shared device identifier associated with a second device,
the shared device identifier being shared by the second device and a third device;
compare the shared device identifier and a set of shared device identifiers;
determine, based on comparing the shared device identifier and the set of shared device identifiers, that a rule is associated with the shared device identifier;
generate the resource identifier for accessing the message based on the rule being satisfied;
provide the resource identifier to the second device using a device identifier that identifies the second device;
receive, from a requesting device, a request to access the message,
the request to access the message including a device identifier that identifies the requesting device and information associated with authenticating the request; and
selectively permit or deny access to the message, by the requesting device, based on the device identifier that identifies the requesting device and the information associated with authenticating the request.

9. The non-transitory computer-readable medium of claim 8, where the one or more instructions, that cause the one or more processors to selectively permit or deny access to the message, cause the one or more processors to:
authenticate the requesting device using the device identifier that identifies the requesting device and the information associated with authenticating the request; and
permit access to the message by the requesting device, when a result of authenticating the requesting device indicates that the device identifier that identifies the second device matches the device identifier that identifies the requesting device, and that the information associated with authenticating the request is authenticated.

10. The non-transitory computer-readable medium of claim 9, where the one or more instructions, that cause the one or more processors to authenticate the requesting device, cause the one or more processors to:
compare the device identifier that identifies the requesting device and the device identifier that identifies the second device; and
determine whether a result of comparing the device identifier that identifies the requesting device and the device identifier that identifies the second device indicates a match.

11. The non-transitory computer-readable medium of claim 9, where the one or more instructions, that cause the one or more processors to authenticate the requesting device, cause the one or more processors to:

provide the information associated with authenticating the request to a network device for authentication; and receive a result of authenticating the request from the network device.

12. The non-transitory computer-readable medium of claim 9, where the one or more instructions further cause the one or more processors to:

provide cookie data to the requesting device,
the cookie data including data indicating that authentication of the requesting device has already occurred;

receive, from the requesting device, a second request to access the message; and permit access to the message based on the cookie data.

13. The non-transitory computer-readable medium of claim 8, where the one or more instructions, that cause the one or more processors to generate the resource identifier, cause the one or more processors to:

determine a subscription associated with the second device; and generate the resource identifier based on determining the subscription associated with the second device.

14. The non-transitory computer-readable medium of claim 8, where the information associated with authenticating the request includes at least one of:

information indicating a digital certificate,
information indicating a security token,
an identifier associated with the requesting device, or
subscriber information associated with a user of the requesting device.

15. A method, comprising:

receiving, by a device, a message intended for a shared device identifier associated with a receiver device,
the shared device identifier being shared by a plurality of receiver devices,
the plurality of receiver devices including the receiver device;

receiving, by the device, an indication to generate a link associated with accessing the message;

comparing, by the device, the shared device identifier and a set of shared device identifiers;

determining, by the device and based on comparing the shared device identifier and the set of shared device identifiers, whether a rule associated with generating the link is satisfied;

determining, by the device, that the device is to generate the link, associated with accessing the message, based on determining that the rule is satisfied;

storing, by the device, information indicating an association between the receiver device and the message;

generating, by the device, the link associated with accessing the message;

providing, by the device, the link to the receiver device using a receiver device identifier that identifies the receiver device;

receiving, by the device and from the receiver device, a request to access the message,
the request to access the message including the receiver device identifier;

authenticating, by the device, the receiver device based on the receiver device identifier and the information indicating the association between the receiver device and the message; and determining, by the device, to permit access to the message by the receiver device based on authenticating the receiver device.

16. The method of claim 15, where the rule associated with generating the link includes the shared device identifier; and where generating the link comprises:
identifying the receiver device, from the plurality of receiver devices associated with the shared device identifier, based on the rule.

17. The method of claim 15, where generating the link comprises:

determining whether the message includes a particular text string; and generating the link based on determining that the message includes the particular text string.

18. The method of claim 15, where generating the link comprises:

determining whether the message includes a security identifier; and generating the link based on determining that the message includes the security identifier.

19. The method of claim 15, where generating the link comprises:

determining a location of the receiver device; and generating the link based on determining the location of the receiver device.

20. The method of claim 15, where generating the link comprises:

determining a type of a network connection of the receiver device; and generating the link based on the type of the network connection of the receiver device.

* * * * *